United States Patent [19]

Kosch

[11] Patent Number: 4,681,277
[45] Date of Patent: Jul. 21, 1987

[54] WELDING WIRE DISPENSER

[75] Inventor: Delmar D. Kosch, Columbus, Nebr.

[73] Assignee: Weldmatic Patents, Inc., Columbus, Nebr.

[21] Appl. No.: 947,422

[22] Filed: Dec. 29, 1986

[51] Int. Cl.⁴ ............... B65H 49/18; B65H 57/18; B65H 59/04
[52] U.S. Cl. ............... 242/156.2; 242/54 R; 242/99; 242/128; 242/129.8
[58] Field of Search ............... 242/156.2, 156, 45, 242/54 R, 75.4, 75.43, 99, 128, 129.8, 47.01

[56] References Cited
U.S. PATENT DOCUMENTS

| | | | |
|---|---|---|---|
| 1,955,785 | 4/1934 | Arkema et al. | 242/128 |
| 2,957,643 | 10/1960 | Bosworth et al. | 242/128 |
| 2,999,654 | 9/1961 | Fuller | 242/128 |
| 3,269,672 | 8/1966 | Steinback | 242/128 |
| 3,282,518 | 11/1966 | Holmes | 242/128 X |
| 3,407,852 | 10/1968 | Lang | 242/128 X |
| 3,567,152 | 3/1971 | Heisler | 242/128 |
| 4,456,198 | 6/1984 | Kosch | 242/156.2 |
| 4,465,246 | 8/1984 | Kosch | 242/156.2 |
| 4,508,291 | 4/1985 | Kosch | 242/156.2 |
| 4,602,753 | 7/1986 | Kosch | 242/156.2 |

Primary Examiner—Stanley N. Gilreath
Attorney, Agent, or Firm—Zarley, McKee, Thomte, Voorhees & Sease

[57] ABSTRACT

A welding wire dispenser for dispensing wire to a wire feeder comprising a floor-engaging support which has an annular brake bad positioned on the upper end thereof. A ball screw assembly is mounted on the support and has a coil spring secured thereto which yieldably resists the rotation of the ball screw in one direction. A shaft is secured to the upper end of the ball screw assembly and is vertically movable therewith. A coil support is rotatably mounted on the shaft above the support and is vertically movable with the shaft. The coil support is adapted to support a coil or reel of welding wire thereon. The coil support has a horizontally disposed annular portion at its lower end which is adapted to frictionally engage the annular brake pad to limit the rotation of the coil support at times. A horizontally disposed accumulator pulley is freely rotatably mounted on the upper end of the shaft above the wire coil. A brake arm is secured to the upper end of the shaft and extends therefrom for rotation therewith. A second pulley is supported on the outer end of the brake arm and has the wire extending from the wire coil received thereon. The wire, after extending around the second pulley, is wrapped around the accumulator pulley for two to three turns and then extends to the wire feeder.

6 Claims, 7 Drawing Figures

WELDING WIRE DISPENSER

BACKGROUND OF THE INVENTION

In many types of welding operations, a wire feeder feeds wire to a welder. The welding wire is normally wound upon coils or reels and is unwound therefrom as wire is being consumed.

One type of wire dispenser is disclosed in U.S. Pat. No. 4,235,624 wherein wire is pulled from a stationary coil. However, a twist or torque is created in the wire and such a twist or torque frequently interferes with the welding operation. Many other types of wire dispensers have also been provided but they are either extremely cumbersome, expensive or difficult to use.

A welding wire dispenser was disclosed in applicant's U.S. Pat. No. 4,456,198 and represented a significant advance in the art. In the device of said patent, the weight of the wire reel causes the reel support to lower into braking engagement. It was found that it is sometimes necessary to move the braking surfaces into contact with one another by means of a spring when the wire on the reel is substantially depleted thereby resulting in less weight. Accordingly, a second patent was granted to applicant on an improvement in a welding wire dispenser and said improvement is disclosed in U.S. Pat. No. 4,465,246.

Although the welding wire dispensers disclosed in applicant's first two patents did represent significant advances in the art, it was found that an improved means for moving the braking surfaces out of frictional engagement with each other was advantageous. The further improved welding wire dispenser of applicant's U.S. Pat. No. 4,508,291 provided an improved means for raising and lowering the coil support and supporting shaft. Applicant has patented yet another improvement of the wire dispenser and the same is disclosed in U.S. Pat. No. 4,602,953.

The welding wire dispensers disclosed in applicant's four patents are each believed to represent a significant advance in the art. The present invention is intended to improve upon applicant's four earlier devices in that the welding wire may be dispensed from the dispenser at a much higher rate of speed than in the earlier devices through the use of an accumulator pulley. The device of the invention also permits wire to be pulled therefrom prior to disengagement of the braking surfaces. Further, the instant invention is more compact and occupies less floor space than some of applicant's earlier devices. A modified device is also described to permit the wire to be dispensed vertically.

SUMMARY OF THE INVENTION

A welding wire dispenser is disclosed which dispenses wire to a wire feeder. A floor-engaging support means is provided and has an annular brake pad positioned on the upper end thereof. A ball screw assembly is provided on the support means and has a coil spring secured thereto to yieldably resist the rotation of the ball screw in one direction. A shaft is secured to the upper end of the ball screw assembly is vertically movable therewith. A coil support is rotatably mounted on the shaft above the support means and is vertically movable with the shaft. The coil support is adapted to support a coil or reel of welding wire thereon. A brake arm assembly is secured to the upper end of the shaft and extends outwardly from the shaft for pivotal movement therewith. A brake arm pulley is mounted on the outer end of the arms. An accumulator pulley is freely rotatably mounted on the upper end of the shaft above the coil and above the brake arm assembly. The wire from the coil extends around the brake arm pulley and thence around the accumulator pulley for two to three wraps and thence to the wire feeder. The initial movement of the wire towards the wire feeder causes the accumulator pulley to rotate and the brake arm to rotate or pivot. Pivotal movement of the brake arm causes the shaft to rotate which causes the ball screw assembly to rotate thereby causing the shaft to vertically move upwardly so that the coil support may freely rotate with respect to the brake pad. The accumulator pulley permits the wire feeder to pull the necessary wire therefrom until the brake arm has sufficiently moved to permit the coil to freely rotate.

A principal object of the invention is to provide an extremely simple yet efficient high speed welding wire dispenser.

Still another object of the invention is to provide a welding wire dispenser having an accumulator pulley provided thereon which permits wire to be pulled therefrom prior to the rotation of the wire coil.

Yet another object of the invention is to provide a welding wire dispenser which is economical of manufacture and durable in use.

These and other objects will be apparent to those skilled in the art.

DESCRIPTION OF THE PREFERRED EMBODIMENT

Figure 1:
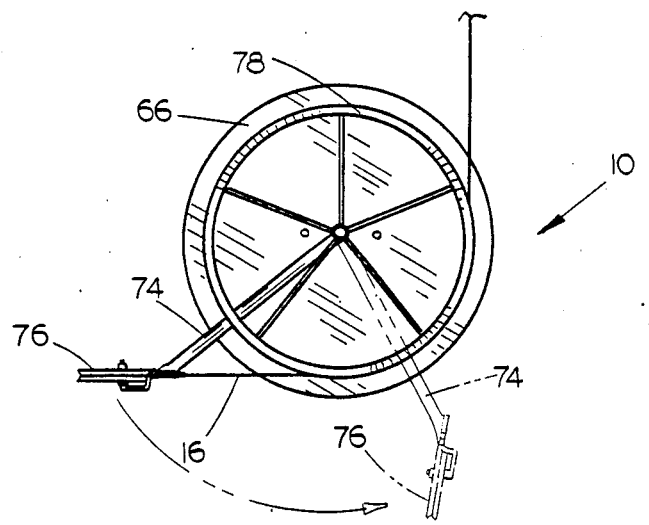
FIG. 1 is a top elevational view of the wire dispenser of this invention with the broken lines indicating the brake arm having been partially rotated or pivoted.
Figure 2:
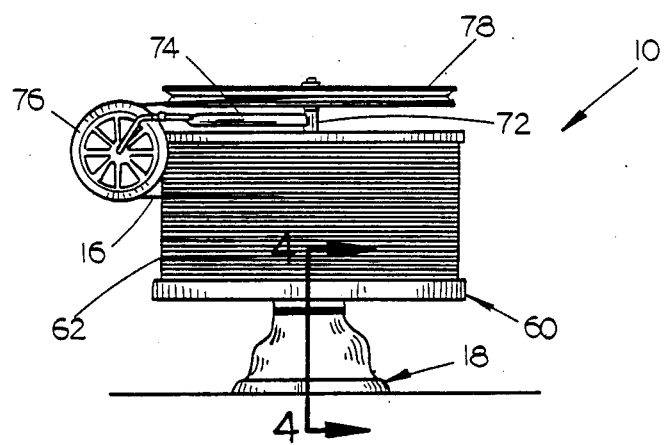
FIG. 2 is a side view of the dispenser of this invention.
Figure 3:
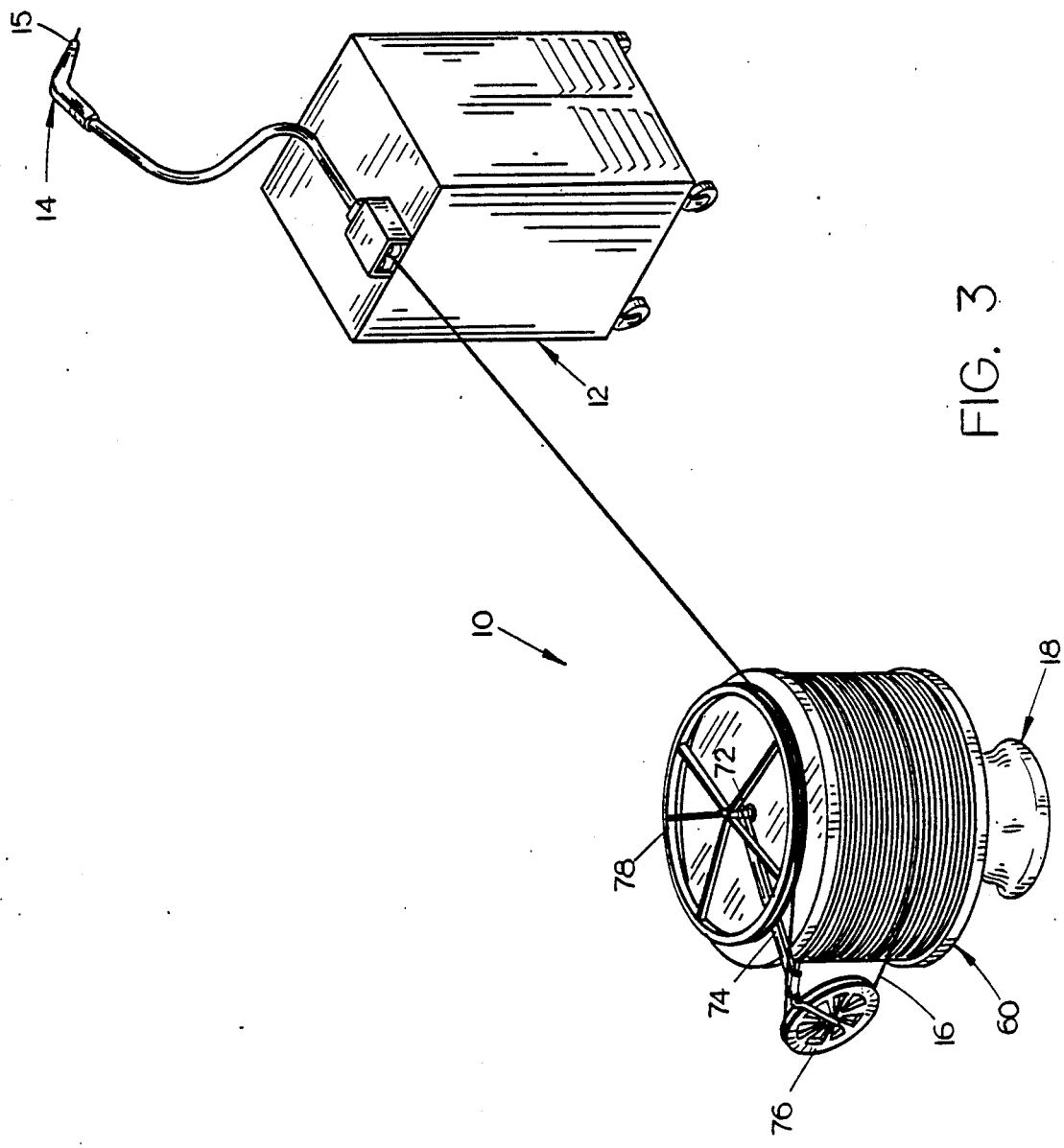
FIG. 3 is a perspective view of the wire dispenser of this invention illustrating its relationship with a wire feeder.
Figure 4:
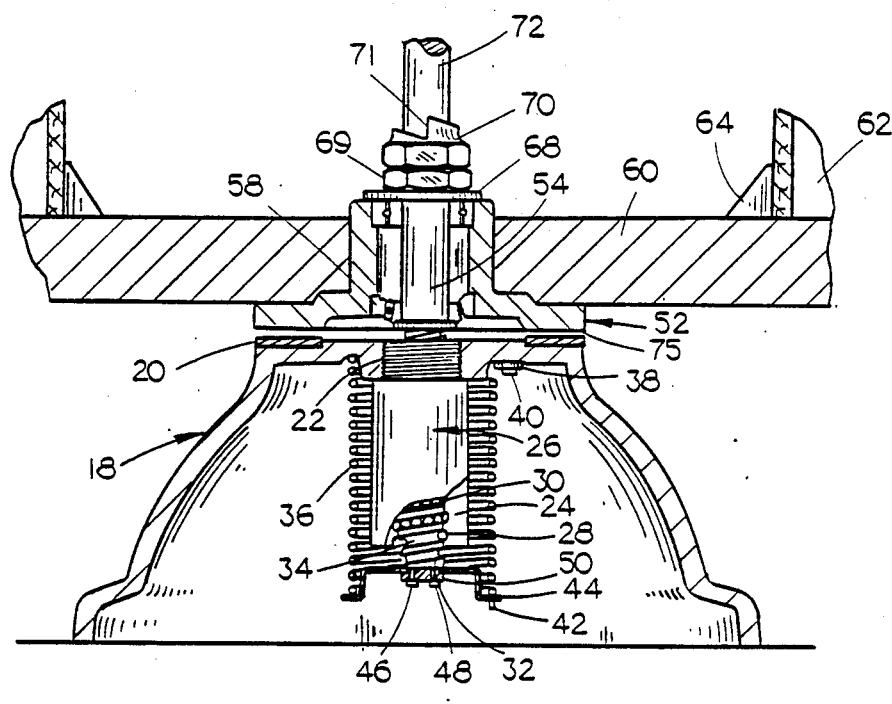
FIG. 4 is an enlarged sectional view seen on lines 4—4 of FIG. 2 illustrating the coil support out of braking engagement with the brake pad.

The wire dispenser of this invention is referred to generally by the reference numeral 10 while the reference numeral 12 refers to a conventional wire feeder adapted to supply welding wire 16 to welder 14 which includes tip 15.

Dispenser 10 includes a floor-engaging support means 18 which is provided with an annular brake pad 20 at its upper end. Support means 18 is also provided with an internally threaded opening 22 formed therein which is adapted to threadably receive the exterior housing portion 24 of a conventional ball screw assembly 26. Housing portion 24 is provided with a helical semi-circular groove 28 formed therein which receives the balls 30. As seen in the drawings, balls 30 are also received in a helical groove 32 formed in screw 34. The upper end of housing portion 24 is threadably received in the threaded opening 22 and has a central opening formed therein through which the screw 34 extends as seen in the drawings.

Spring 36 embraces the ball screw assembly 26 and has its upper end 38 connected to ear 40 which extends downwardly from support means 18. The lower end 42 of spring 36 is connected to spring adjustment plate 44 which is secured to the lower end of screw 34 by bolt or cap screws 46 and 48. As seen in the drawings, cap screws 46 and 48 extend upwardly through washer 50 and are threadably received by the lower end of screw 34. The washer 50 forces the member 44 into frictional engagement with the lower end of the screw 34 to maintain the member 44 in position. When it is desired to vary the torque of the spring 36, the cap screws 46 and 48 are loosened so that element 44 may be rotated relative to the screw 34. Rotation of element 44 with respect to screw 34 causes the torque of the spring 36 to either be increased or decreased.

The numeral 52 refers to a coil support which is rotatably mounted on the shaft 54 which extends upwardly from the screw 34. Coil support 52 is rotatably mounted on the shaft 54 by bearings 56 and 58. As seen in the drawings, coil support 52 is vertically movable with the shaft 54. As seen in the drawings, coil support 52 includes a plurality of radially extending arms 60 adapted to support the coil or reel 62 thereon. Upstanding members 64 are provided on the supports 60 to aid in positioning the reel 62 on the support 52. The coil 62 is maintained on the support 52 by any convenient means such as by some sort of cover 66 clamped onto the upper surface of the reel or coil.

A flat washer 68 embraces shaft 54 above bearing 56. A left hand jam nut 69 is mounted on shaft 54 above washer 68 and has a left hand engagement nut 70 positioned thereabove which has a "helical" notched portion 71 at its upper end. The lower end of shaft 72 removably embraces the upper end of shaft 54 and has a "helical" notched portion 73 at its lower end which engages notched portion 71 as seen so that rotational movement of shaft 72, in one direction only, will cause shaft 54 to rotate. Shaft 72 extends upwardly through the center of the reel and has a laterally extending brake arm 74 secured thereto for rotation therewith. Pulley 76 is rotatably mounted on the outer end of brake arm 74 about a horizontal axis as seen in the drawings. An accumulator pulley 78 is freely rotatably mounted on the upper end of shaft 72. When the device is at rest, the wire 16 extends from the reel, around pulley 76 as illustrated, and thence around the accumulator 78 for two or three turns, thence to the wire feeder.

Figure 7:
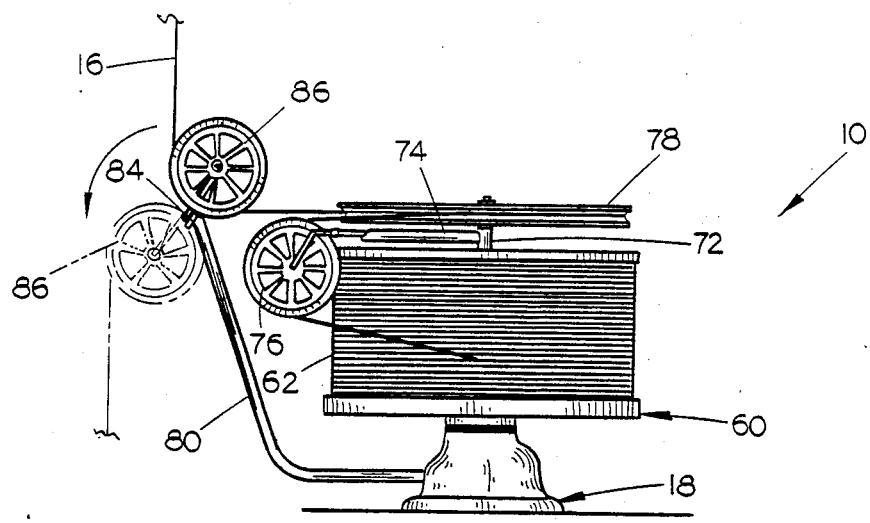
FIG. 7 is a side view of the apparatus of FIG. 6 with the broken lines illustrating an alternate position of the feeding pulley.
Figure 6:
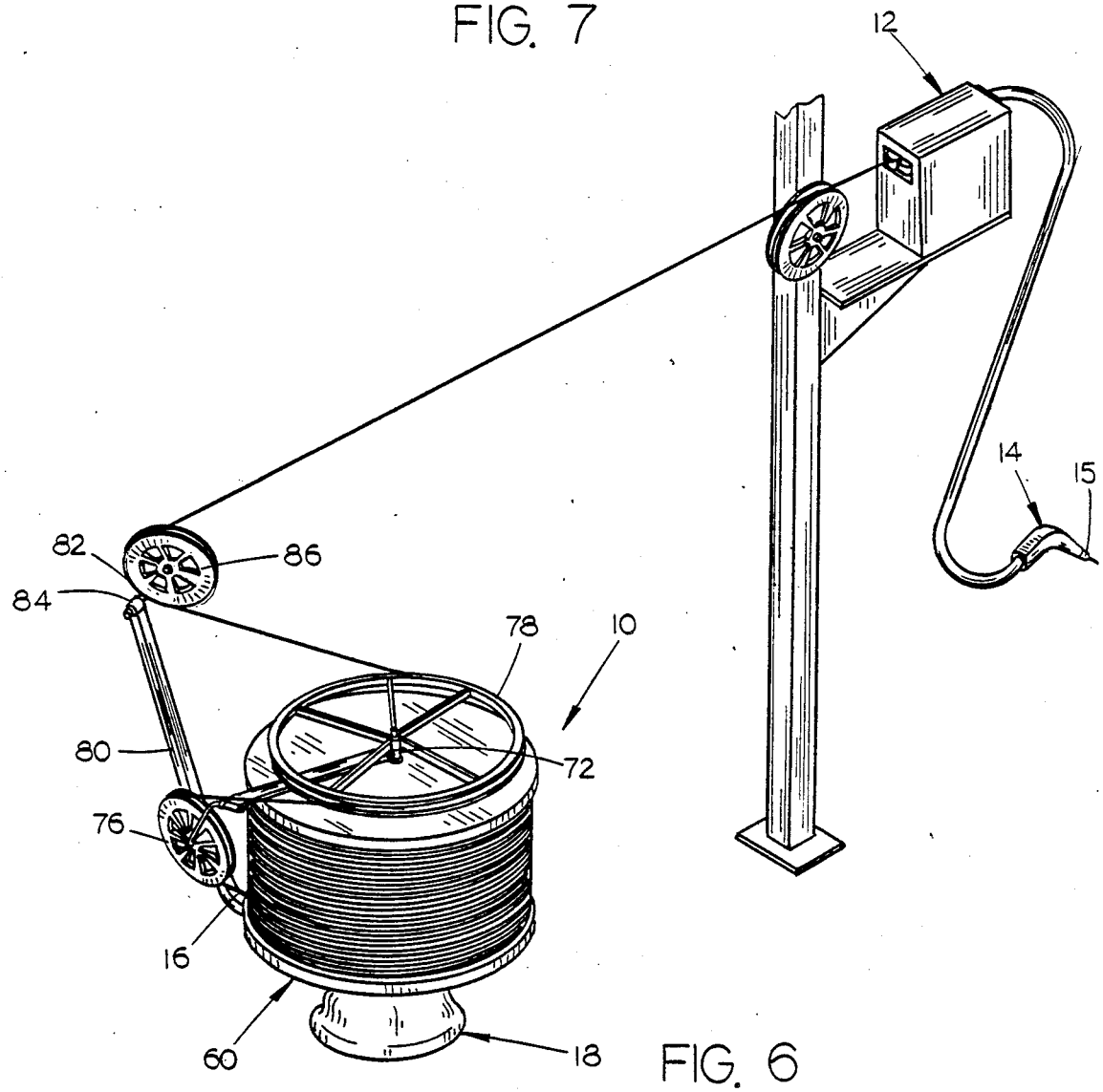
FIG. 6 is a perspective view illustrating an optional device mounted on the device designed for vertical feeding.

FIGS. 6 and 7 illustrate an optional attachment when the wire 16 is to be fed vertically from the accumulator pulley 78. In FIGS. 6 and 7, the numeral 80 refers to a support arm which is rigidly secured to support means 18 and which extends first horizontally therefrom and thence upwardly and outwardly therefrom as seen in the drawings. Shaft 82 is pivotally mounted in sleeve 84 which is secured to the upper end of support arm 80. Shaft 82 may be rotated from the position illustrated by solid lines in FIG. 6 to the position illustrated by broken lines in FIG. 7 so that the wire 16 when passing from the accumulator pulley 78 may either be fed vertically upwardly to the wire feeder 12 when the pulley 86 is in the position illustrated by solid lines in FIGS. 6 and 7 or fed vertically downwardly from the accumulator pulley 78 when the pulley 86 and the shaft 82 are in the position illustrated by broken lines in FIG. 7.

Figure 5:
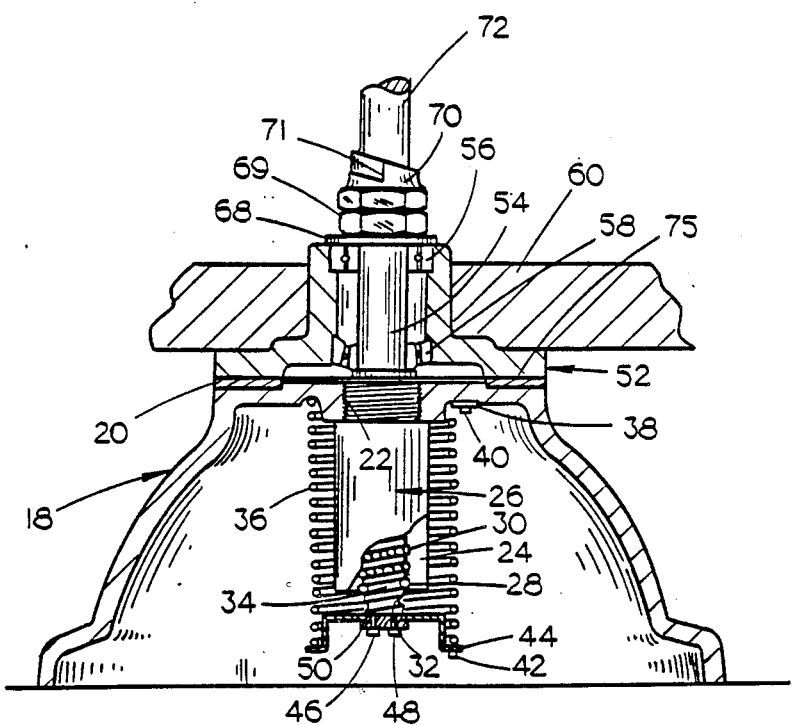
FIG. 5 is a view similar to FIG. 4 except that the coil support has been lowered into engagement with the brake pad.

In operation, the accumulator pulley 78, shaft 72 and brake arm 74 would initially be removed from the shaft 54 and the cover 66 removed with the reel 52 being placed on the member 60. The shaft 72, brake arm 74 and accumulator pulley 78 are then replaced. The straps maintaining the wire on the reel in position would be removed and the wire 16 extended around the pulley 76 and thence for two or three turns around the accumulator pulley 78. The wire 16 is then fed through the wire feeder 12 and extended through the tip 15 on the welder 14. The coil support 52 is normally in the position illustrated in FIG. 5 with the annular portion 75 of support 52 being in frictional engagement with the brake-lining material 20 which prevents rotation of the support means 52 relative to the support means 18.

As the wire feeder 12 initially pulls wire, the accumulator pulley 78 rotates and brake arm 74 pivots before coil support 52 begins to rotate thereby permitting wire to be fed to the wire feeder before the annular portion 75 disengages from brake-lining material 20. The feeding of wire from the accumulator pulley 78 is desirable since some movement of the brake arm 74 is required before the annular portion 75 moves out of frictional engagement with the brake lining material 20 to permit the reel to rotate. As the brake arm 74 is pivoted by the wire being pulled towards the wire feeder, shaft 72 is also rotated which causes shaft 54 to be rotated. The rotation of the shaft 54 causes screw 34 to rotate relative to the outer housing portion 24. Rotation of screw 34 relative to outer housing portion 24 causes the screw 34 to move upwardly due to the relationship of the helical grooves and balls. As the screw 34 moves upwardly relative to outer housing portion 24, spring 36 is twisted or turned into compression. Upward vertical movement of the shaft 54 causes the annular portion 75 of the support 52 to be moved out of frictional engagement with the brake lining material 20 thereby permitting support 52 and the coil 62 to rotate so that wire can be dispensed therefrom. When the wire feeder 12 stops pulling wire, the weight of the coil 62 and the resiliency of the spring 36 causes the screw 34 to rotate relative to the outer housing portion 24 to return the brake arm 74 to the starting position. This particular feature allows the full weight of the wire coil to apply the brake to the rotation of the coil and to stop the rotation of the coil. The braking action is enhanced by the spring 36 as previously described. Thus, when the coil is substantially full, a large amount of force will be needed to brake the coil but the weight of the coil will apply that force. Conversely, when the remaining amount of wire on the coil is low, very little braking force will be needed to halt the rotation of the coil.

The wire dispenser of this invention dispenses welding wire to the wire feeder in a smooth rapid fashion so that the welding operation will be smooth. The accumulator pulley 78 and the relationship of the brake arm 74 permits the wire to be fed to the wire feeder before the coil support begins to rotate. The wire dispenser of this invention is also compact and occupies very little floor space.

Thus it can be seen that the wire dispenser of this invention accomplishes at least all of its stated objectives.

I claim:

1. A welding wire dispenser for dispensing wire to a wire feeder, a support means having a first brake portion thereon, a vertically disposed shaft means rotatably mounted on said support means and extending upwardly therefrom, said shaft means being vertically movable between first and second positions with respect to said support means, means mounting said shaft means on said support means whereby rotation of said shaft means in one direction will cause said shaft means to vertically move upwardly relative to said support means and whereby rotation of said shaft means in an opposite direction to said one direction will cause said shaft means to move downwardly relative to said support means, a coil support means rotatably mounted on said shaft means above said support means and vertically movable with said shaft means, said coil support means having a second brake portion thereon adapted to frictionally engage said first brake portion to limit the rotation of said coil support means when said brake portions are in frictional engagement with each other when said shaft means is in its said first position, said coil support means adapted to support a coil of welding wire thereon, a brake arm operatively secured to the upper end of said shaft and extending laterally relative to said coil support means, a first pulley rotatably mounted on the outer end of said brake arm adapted to have the welding wire on the coil extending therearound, an accumulator pulley freely operatively rotatably mounted on said shaft means above the coil and adapted to receive the welding wire thereon after the welding wire has passed around said first pulley, said brake arm adapted to rotate said shaft when the welding wire is pulled towards the wire feeder, said shaft vertically moving upwardly from its said first position towards its said second position so that said brake portions will not be in frictional engagement with each other so that said coil support means may freely rotate when the welding wire is pulled toward the wire feeder, said accumulator pulley permitting wire to be pulled therefrom towards said wire feeder prior to the disengagement of said brake portions.

2. The dispenser of claim 1 wherein said brake arm is movable approximately 360° relative to said support means.

3. The dispenser of claim 1 wherein the welding wire is wrapped around said accumulator pulley for a plurality of wraps.

4. The dispenser of claim 3 wherein said first pulley is rotatable about a horizontal axis.

5. The dispenser of claim 1 wherein a support arm extends outwardly and upwardly from said support means, a vertical feed pulley rotatably mounted on said support arm adapted to have the welding wire extend therearound after said wire has passed from said accumulator pulley for vertical feeding.

6. The dispenser of claim 5 wherein the wire may be fed either vertically, upwardly or downwardly from said vertical feed pulley.

* * * * *